(12) United States Patent
Lim et al.

(10) Patent No.: US 9,753,050 B2
(45) Date of Patent: Sep. 5, 2017

(54) WIND TURBINE COMPONENT HAVING AN OPTICAL FIBRE WIND SENSOR

(71) Applicant: VESTAS WIND SYSTEMS A/S, Aarhus N (DK)

(72) Inventors: Chee Kang Lim, Singapore (SG); Jia Liang Ang, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 87 days.

(21) Appl. No.: 14/763,374

(22) PCT Filed: Feb. 15, 2013

(86) PCT No.: PCT/DK2013/050041
§ 371 (c)(1),
(2) Date: Jul. 24, 2015

(87) PCT Pub. No.: WO2014/124646
PCT Pub. Date: Aug. 21, 2014

(65) Prior Publication Data
US 2015/0362517 A1 Dec. 17, 2015

(51) Int. Cl.
*G01P 5/02* (2006.01)
*G01D 5/26* (2006.01)

(52) U.S. Cl.
CPC ............... *G01P 5/02* (2013.01); *G01D 5/268* (2013.01)

(58) Field of Classification Search
CPC .................................. G01P 5/02; G01D 5/268
See application file for complete search history.

(56) References Cited

U.S. PATENT DOCUMENTS

| 5,321,257 A | 6/1994 | Danisch |
| 6,940,186 B2 * | 9/2005 | Weitkamp ............... F03D 7/042 290/44 |

(Continued)

FOREIGN PATENT DOCUMENTS

| DE | 102010016837 A1 | 1/2011 | |
| DK | GB 2462603 A * | 2/2010 | ........... G01B 11/161 |

(Continued)

OTHER PUBLICATIONS

Machine translation of DE 102010016837 A1.*

(Continued)

*Primary Examiner* — David Bolduc
(74) *Attorney, Agent, or Firm* — Patterson + Sheridan, LLP

(57) ABSTRACT

The application relates to a wind turbine component having an optical fiber sensor arranged to detect wind speed over the surface of the component. In one embodiment, the optical fiber sensor has a light loss portion that allows some of the light transmitted through the optical fiber to escape. The amount that the optical fiber bends in the air flow across the surface causes the effective surface area of the light loss portion to increase or decrease. With increased or decreased surface area of the light loss portion, more or less light is lost from the fiber. The intensity of the light transmitted in the fiber can therefore be used as a measure of the amount of bending, and therefore as a measure of the air flow's speed. In other embodiments, the optical fiber includes optical gratings, such as Fiber Bragg Gratings.

14 Claims, 5 Drawing Sheets

(56) References Cited

U.S. PATENT DOCUMENTS

| | | | | |
|---|---|---|---|---|
| 7,324,714 B1* | 1/2008 | Cranch | ........... | G01B 11/18 250/227.16 |
| 7,458,273 B2* | 12/2008 | Skinner | ........... | E21B 47/06 73/716 |
| 7,521,083 B2* | 4/2009 | Teichert | ........... | B08B 1/04 134/12 |
| 2007/0297712 A1* | 12/2007 | Meneghini | ........... | G01B 11/18 385/13 |
| 2008/0317598 A1* | 12/2008 | Barbu | ........... | F03D 7/022 416/9 |
| 2009/0092352 A1* | 4/2009 | Ng | ........... | G01D 5/35303 385/13 |
| 2009/0185772 A1* | 7/2009 | Xia | ........... | A61B 5/0059 385/13 |
| 2009/0246019 A1* | 10/2009 | Volanthen | ........... | F03D 17/00 416/1 |
| 2009/0311098 A1* | 12/2009 | Kappel | ........... | F03D 1/06 416/61 |
| 2010/0011862 A1* | 1/2010 | Kuhlmeier | ........... | G01H 1/003 73/587 |
| 2010/0054935 A1* | 3/2010 | Olesen | ........... | G01B 11/18 416/1 |
| 2010/0090463 A1* | 4/2010 | Nies | ........... | F03D 7/0204 290/44 |
| 2010/0132137 A1* | 6/2010 | Eggleston | ........... | B08B 1/02 15/21.1 |
| 2010/0143118 A1* | 6/2010 | Eggleston | ........... | F03D 7/0204 416/1 |
| 2010/0143129 A1 | 6/2010 | Fisher | | |
| 2010/0232961 A1* | 9/2010 | Volanthen | ........... | G01D 5/35303 416/61 |
| 2010/0329415 A1* | 12/2010 | Stiesdal | ........... | F03D 1/003 378/4 |
| 2011/0090110 A1* | 4/2011 | Tralshawala | ........... | F03D 1/003 342/25 A |
| 2011/0110778 A1* | 5/2011 | Lim | ........... | F03D 1/0675 416/61 |
| 2011/0135476 A1* | 6/2011 | Olesen | ........... | G01L 1/246 416/61 |
| 2011/0138937 A1* | 6/2011 | Fritz | ........... | G01M 11/081 73/865.8 |
| 2011/0211200 A1* | 9/2011 | Cribbs | ........... | F03D 1/0675 356/614 |
| 2011/0268570 A1 | 11/2011 | Loganathan et al. | | |
| 2011/0292377 A1* | 12/2011 | Osenberg | ........... | G01D 5/268 356/73 |
| 2012/0229792 A1* | 9/2012 | Fuglsang | ........... | F03D 7/0224 356/28 |
| 2013/0300117 A1* | 11/2013 | Hjort | ........... | F03D 17/00 290/44 |
| 2014/0151578 A1* | 6/2014 | Glavind | ........... | G01M 5/0016 250/459.1 |
| 2014/0239166 A1* | 8/2014 | Hjort | ........... | G01M 5/0016 250/227.18 |

FOREIGN PATENT DOCUMENTS

| | | |
|---|---|---|
| GB | 2398841 A | 9/2004 |
| WO | 2010/017993 A2 | 2/2010 |
| WO | 2012/089546 A2 | 7/2012 |

OTHER PUBLICATIONS

Joseba Zubia et al: "Barrier Sensor Based on Plastic Optical Fiber to Determine the Wind Speed at a Wind Generator", IEEE Journal of Selected Topics in Quantum Electronics, IEEE Service Center, Piscataway, NJ, US, vol. 6, No. 5, 1 Sep. 2000, pp. 773-774.

International Search Report for PCT/DK2013/050041, Sep. 27, 2013.

* cited by examiner

WIND TURBINE COMPONENT HAVING AN OPTICAL FIBRE WIND SENSOR

The invention relates to a wind turbine component having an optical fibre wind sensor, and to a corresponding method for operating the sensor.

When operating a wind turbine it is necessary to know the incident wind speed for control and safety purposes. In normal operation, for example, knowing the wind speed allows the turbine operator to monitor the power production using a power curve, and feed back information on the wind turbine's efficiency to monitoring and control programs.

Further, in high winds, it may not be safe to operate the wind turbine and it may be necessary to bring the turbine to a standstill. Alternately, it may be desirable to pitch the wind turbine blades so that the wind is spilled and the wind related load on the blades does not exceed a maximum safe operating threshold.

To date, sensors for determining incident wind speed have suffered from a number of disadvantages. Many sensors rely on a cup anemometer usually located on the wind turbine nacelle. Such systems do not typically give an accurate measurement of wind speed, as they are located behind (down wind) of the wind turbine rotor, and are subjected to the wake of the rotor blades as they turn.

Other sensors rely on LIDAR (Light Detection and Ranging) systems that are mounted on the nacelle or rotor hub and which look forward from the rotor to measure the far field wind speed. Such systems are generally expensive and require regular maintenance to keep them free of accumulated dirt or ice. Like cup anemometers LIDAR does not provide accurate information of the local wind speed over the wind turbine, only a broader measurement of the incident wind.

Other sensor systems using optical fibres have been proposed for measuring a local wind speed, that is the wind speed next to a wind turbine component. These sensor systems are arranged to operate like LIDAR systems, but to work in the near field. Light is output from an optical fibre embedded in a wind turbine component or wind turbine blade and is reflected from particles or aerosols in the incident wind. The reflected light can be collected and can be processed in the wind turbine. Such systems offer an advantage over the full complexity of the far field LIDAR systems but typically also require complicated processing in order to give a reliable signal.

We have therefore appreciated that it would be desirable to provide a wind turbine component having an optical fibre sensor system that is both easy and inexpensive to operate and install.

SUMMARY OF THE INVENTION

The invention is defined in the independent claims to which reference should now be made. Advantageous features are set forth in the dependent claims.

In a first aspect of the invention a wind turbine component is provided comprising: an optical fibre having a sensing portion extending from the wind turbine component surface into the air flow adjacent the wind turbine component surface, such that the optical fibre sensing portion bends as a result of a force exerted by the air flow; a light source for inputting a light signal into at least one end of the optical fibre, the light signal having an optical characteristic that is changed by its transmission through the optical fibre and by the amount the optical fibre is bending; a photo detector for receiving a light signal from the sensing portion of the optical fibre; and a controller coupled to the photo detector to determine the wind speed from the optical characteristic of the received light signal.

The system for detecting the bending of the optical fibre advantageously provides a low cost wind speed sensor that is not prone to attracting lighting strikes or to the accumulation of dirt or ice.

In one embodiment, the bending of the optical fibre sensing portion is constrained to a first axial direction. This provides a direction of sensitivity for the measurements from the sensor, simplifying the measure of wind speed which in laminar flow situations can be assumed to be largely uni-directional across the wind turbine component.

Advantageously, the bending of the optical fibre sensing portion has a range defined by a maximum and a minimum value, either the minimum value corresponding to a no wind situation, or a middle value corresponding to a no wind situation. Thus, the sensor can be used to provide a directional indication as well as a speed indication.

A first end of the sensing portion is fixed at the surface of the wind turbine component surface, and a second end of the sensing portion is free to move in the air flow. The light source and photo detector may then be coupled to the first end of the sensing portion, and the second end of the sensing portion has a mirror for internally reflecting light within the optical fibre. This allows the optical fibre sensor also to serve as a stall sensor for a wind turbine blade.

In one embodiment, the optical characteristic is the intensity of the received light, and wherein the surface of the optical fibre sensing portion has one or more light loss portions arranged to allow light to escape from the fibre, the amount of light escaping from the fibre depending on the amount of bending of the light loss portion. Measurement of the intensity of the light is straight-forward to implement. Further, the measurements of intensity have been found to have a very low sensitivity to thermal expansion or contraction of the fibre.

The light loss portion may comprise a cut-out in the coating of the optical fibre, and may further comprise cut-outs with serrations into the core or coating. The serrations or cut outs increase the effect of the bending on the exposed area of the light loss portion.

In another embodiment, the sensing portion is attached to a resilient support member also extending into the air flow. The resilient support member can be used to mount a second optical fibre onto the wind turbine component to give a measurement of directionality, or alternatively may be used to provide additional stiffness or support to a single optical fibre.

The optical fibre sensing portion may have one or more gratings, the spacing of the gratings changing due to bending of the sensing portion.

The optical fibre may have two sensing portions, and the optical fibre is doubled back on itself, so that the sensing portions are adjacent one another, and the optical fibre extends from the surface of the wind turbine component at two locations.

In another aspect of the invention, a stall sensor is provided for a wind turbine blade comprising the wind turbine component referred to above.

In a further aspect of the invention, a stagnation point sensor is provided for a wind turbine blade comprising the wind turbine component referred to above.

A further aspect of the invention provides a corresponding method and computer program for carrying out the method.

BRIEF DESCRIPTION OF THE DRAWINGS

Preferred embodiments of the invention will now be described by way of example and with reference to the drawings in which.

DETAILED DESCRIPTION OF EXAMPLES OF THE INVENTION

Example embodiments of the invention will now be described in more detail, initially with reference to FIGS. 1, 2 and 3. These figures shows a first arrangement of an optical fibre sensor mounted on a wind turbine component, such as wind turbine blade, hub, nacelle or tower. The optical fibre is arranged to provide a light signal with an optical characteristic that varies depending on the amount the optical fibre is bending. The bending is a result of the optical fibre being positioned in a flow of wind over the wind turbine component, and subject to a force from the wind. The bending is therefore a function of the local wind speed. Slower wind speeds result in less bending of the optical fibre, and greater wind speeds result in more bending of the optical fibre.

Embodiments of the invention convert the amount of bending detected by the optical fibre sensors to an indication of wind speed. Depending on the position of the sensor, the detected wind speed may be the local wind speed across an aerodynamic surface of the wind turbine blade, or the wind speed of the wind incident on the wind turbine nacelle as a whole. These sensor parameters may then be used in processes for controlling the wind turbine or for feedback data indicating the local conditions or operating regime.

In the more specific examples discussed below, the wind speed that is detected is the local wind speed across an aerodynamic surface of a wind turbine blade. This measurement can be used to determine the angle of attack of the blade, in a optical fibre stall sensor, and in a optical fibre stagnation point sensor.

Although the optical fibre may be mounted on the wind turbine component so that it extends into the wind flow, it may also be mounted on a resilient supporting component disposed in the flow of wind.

Figure 1:
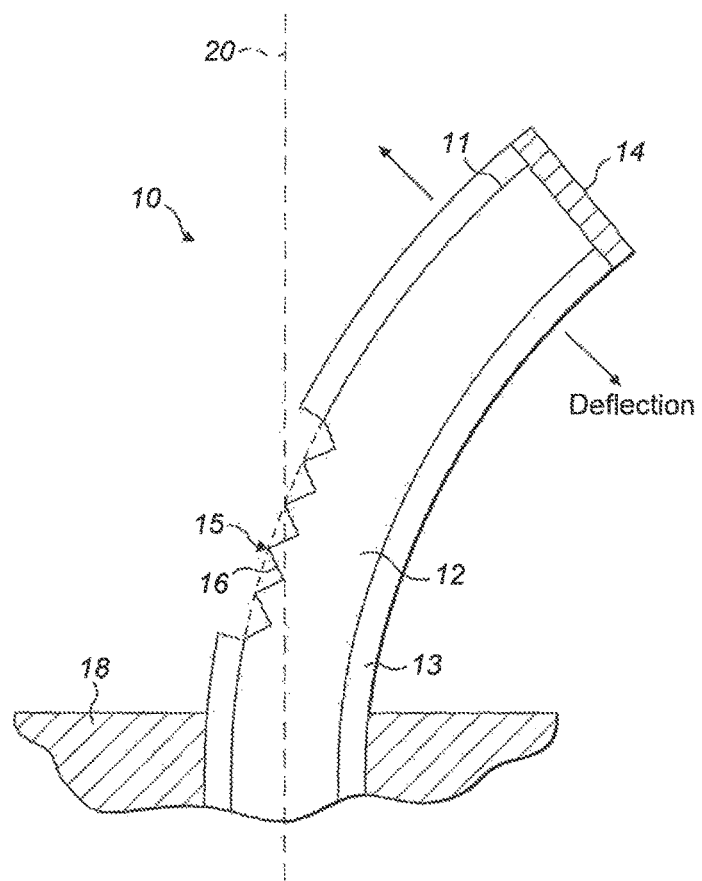
FIG. 1 is a schematic illustration of a first optical fibre sensor arrangement for detecting wind speed.

Referring now to FIG. 1, there is illustrated a optical fibre deflection or bending sensor 10. The sensor comprises an optical fibre 11 having a core 12 and cladding 13. The optical fibre is terminated by a mirror portion 14, so that light travelling along the fibre (in the direction from the bottom of the fibre to the top, for example, as shown in FIG. 1) is reflected back internally (from the top of the fibre to the bottom).

The optical fibre 11 of the sensor 10 has a portion where the cladding 13 is more permeable to light. This can be achieved by entirely or partially removing the cladding from the fibre. This portion then forms a light loss portion 15 at which the core 12 is exposed, enabling light travelling in the optical fibre core 12 to escape. The exposed surface may be smooth, or optionally may be corrugated as indicated in FIG. 1 by the ridges or serrations 16. Corrugations 16 have been found to increase the amount of light lost from the light loss portion 15 to outside the core 12.

Figure 2:
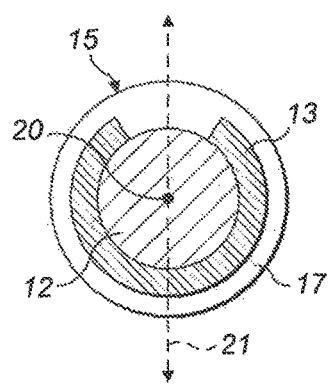
FIG. 2 is a cross section through the optical fibre shown in FIG. 1.

FIG. 2 illustrates a cross sectional view through the optical fibre 11, illustrating the light loss portion 15 further. As can be seen from the cross section, the light loss portion is present only on one side of the fibre, although in other embodiments, further separate light loss portions may be located on the periphery of the fibre (such as at positions that are angularly spaced from the first by 120 degrees or 90 degrees for example). The effect of having the light loss portion on only one side of the fibre is to create a sensor axis 21, namely a direction of bending in which variations in the optical fibre position cause greater variations in the optical characteristic of the light signal in the fibre.

The core 12 and the cladding 13 may optionally be covered by a light absorbing material 17. Although in FIG. 2, the core 12 is shown as being entirely free of cladding 13 at the light loss portion 15, it is possible that some cladding may remain. If cladding 13 remains, then the amount of light lost from the core 12 is not as great, but the sensor can still operate.

As shown most clearly in FIG. 1, the optical fibre sensor 10 extends for a small distance from the surface 18 of a wind turbine component, such as a wind turbine blade. In this way as wind moves across the surface 18 of the component it causes the optical fibre sensor to bend or deflect in accordance with the wind strength and direction. The optical fibre sensor 10 is preferably arranged on the wind turbine component so that the direction of bending due to the wind is aligned with the sensor axis 21. On a wind turbine blade for example, the air will in laminar conditions flow from the leading edge to the trailing edge across the surface. The optical fibre sensor is therefore placed so that the sensor axis points parallel to the chord line through the blade.

The portion of the optical fibre 11 extending from the surface 18 of the wind turbine component forms a sensing portion of the optical fibre.

The operation of the sensor will now be explained in more detail. Initially, it is useful to consider the position of the optical fibre 11 in relation to a neutral axis 20, which can for example correspond to a calibration or setting position. In FIG. 1, the optical fibre is shown with a non-zero deflection relative to this axis 20, as will be the case when the fibre is used in a windy environment.

Assuming that the optical fibre 11 is parallel to neutral axis 20 the exposed light loss section 15 of the optical fibre will allow a certain proportion of light travelling in the fibre core 12 to escape to the outside.

The amount of light is dictated by the material from which the fibre is made, the angle required for total internal reflection, and the size of the light loss section 15. All of these characteristics are determined by configuration of the optical fibre, and can be determined during a calibration operation or be design.

If the optical fibre is subsequently deflected away from the neutral axis 20, away from the side on which the light loss portion is situated (towards the trailing edge of the blade for example), the light loss portion 15 will in turn stretch presenting a greater area for light to escape. This change results in more light escaping from the core 12 in the deflected position shown in FIG. 1, than when the fibre is in a neutral position parallel to axis 20. Similarly, if the optical fibre bends towards the side on which the light loss portion 15 is situated (towards the leading edge for example) then the exposed surface area of the light loss portion 15 will shrink or contract and present a reduced area for the light to escape. This change results in less light escaping from the fibre core 12 than when the fibre is in the neutral position. The serrations 16 have been found to increase this effect.

The end stop mirror 14 means the magnitude of the light loss is effectively doubled as the light passes first in one direction and then in the reverse direction along the fibre.

At a sensor suite (not shown in FIGS. 1 and 2) the amount of light received from the fibre (following reflection at the mirror 14) is converted into a voltage signal and used to determine an amount of bending. The magnitude of the voltage signal varies depending on the amount of light lost through the light loss portion 15, and therefore, depending on the deflection or bending of the optical fibre sensor. In the arrangement described above, the highest voltage signal will be given for deflections of the fibre 11 towards the side where the light loss portion 15 is situated (as bending in this direction means less light escapes) and the lowest for deflections of the fibre 11 away from the side having the light loss portion 15. The neutral position 20 will be in between. For this reason, in this embodiment, the light loss portion 15 does not extend around the whole optical fibre, but is merely situated on one side of the circumference in order to create the sensor axis 21 and a sense of directionality for the resulting voltage signal.

Figure 3:
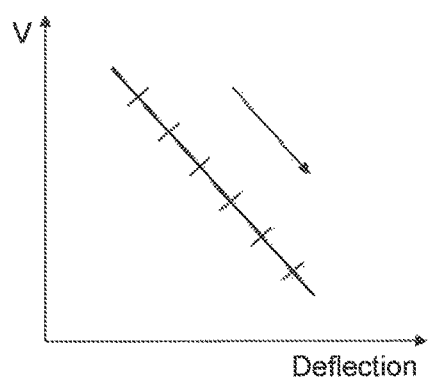
FIG. 3 is a schematic diagram illustrating the relationship between the light signal received from the optical fibre (converted to a voltage) and the deflection of the optical fibre.

The schematic graph of FIG. 3 illustrates the sensor output that can be expected when the light signal received from the optical fibre 11 is converted to a voltage signal. As the optical fibre sensor 11 bends to the right (the trailing edge direction for a wind turbine blade) as indicated by the arrow, the voltage signal decreases.

Calibration of the optical fibre deflection with wind speed to define an initial or zero position can be carried out in a wind tunnel for each type of optical fibre used and for each respective position of the optical fibre on the wind turbine.

Once this calibration has been completed, the calibrated data can be assumed to hold true for each sensor that is installed in the wind turbine. In this context calibration means establishing a reference bending or deflection amount with a reference value of light intensity, as well as establishing the notional ends of the measurement scale, that is the maximum or minimum value. The minimum value of the measurement scale may coincide with the reference or zero position (such as the neutral axis mentioned above) in which case the bending of the optical fibre is assumed to be of interest only in one direction from that zero position (the positive direction). Alternatively, the minimum position may be less than the reference or zero position, such as when deflection of the optical fibre in both directions from zero (positive and negative) is of interest. If desired, each sensor could also be calibrated in the field by a wind turbine installation engineer.

It will be appreciated that the properties of the optical fibre, in particular the stiffness or resistance of the optical fibre to bending, will have an effect on the operation of the sensor. If the optical fibre is very stiff then only very strong winds will result in a measurable deflection. On the other hand, if the optical fibre is not stiff enough then it could bend too easily and flap around in the wind obscuring any useful signal. The stiffness of the optical fibre is a function of the material from which the optical fibre is made, as well as its diameter. Selection of an appropriate material and diameter depends on the detectable range of wind speeds expected. As this embodiment operates by detecting the amount of light that has been lost from the fibre, the embodiment is not affected by changes in temperature of the optical fibre.

Figure 4:
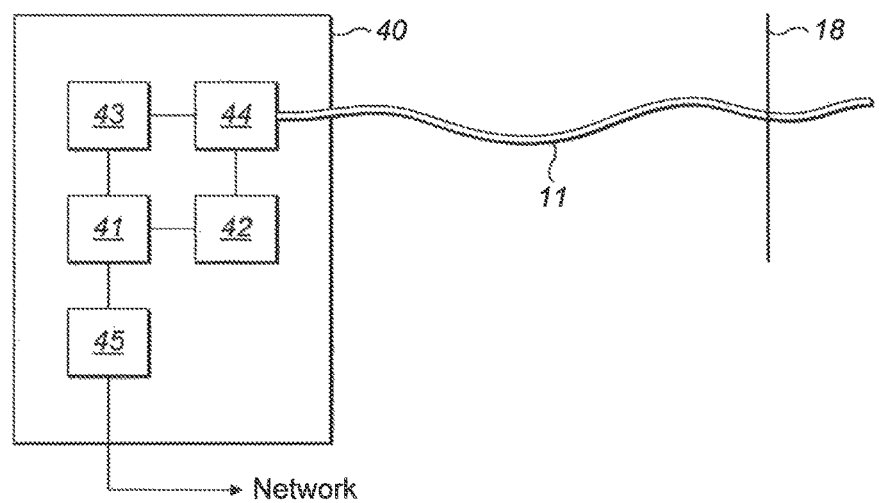
FIG. 4 is a diagram showing an apparatus for operating the first optical fibre sensor arrangement.

FIG. 4 illustrates a sensor suite 40 for controlling the light signals input into the optical fibre sensor. Sensor suite 40 is preferably housed in the nacelle or the rotor hub of the wind turbine. This allows a single sensor suite 40 to control multiple optical fibre sensors, and means that it is easy to access the sensor suite for maintenance at installation. The sensor suite 40 comprises a controller 41 connected to a light source 42 and photo detector 43. Light source 42 and photo detector 43 are connected in turn to light coupler 44 which is connected to the optical fibre sensor 11. Controller 41 may in turn be connected to a network connection 45 for transmitting the collected data to a SCADA type system monitoring all of the wind turbines in a wind park.

The light source may be any suitable light source for inputting light into the optical fibre 11, such as a light emitting diode (LED) or semiconductor laser. The light detector can also be any suitable photo sensitive optoelectronic device, such as a photo diode. Using an LED and photo diode means that the implementation of the device can be made inexpensive.

In operation the controller 41 controls the light source 42 to input light into the optical fibre 11 during a first measurement period.

The light enters the optical fibre through the optical coupler 44. The light travels in the optical fibre and is reflected by the mirror at the end of the fibre back to the optical coupler 44, and from there to the photo detector 43.

The photo detector 43 turns the received light signal into an electrical signal indicative of the light intensity and passes this in turn to the controller 41 for processing. The controller 41 compares the detected light signal to the reference or calibration value and outputs a value indicative of the wind speed. The light intensity, the electrical value and the wind speed are all functions of the amount of bending experienced by the optical fibre sensor, and so can be easily computed by the controller as described above.

In other embodiments, the end stop mirror can be omitted and the optical fibre can be looped back on itself to connect with coupler 44.

Figure 5:
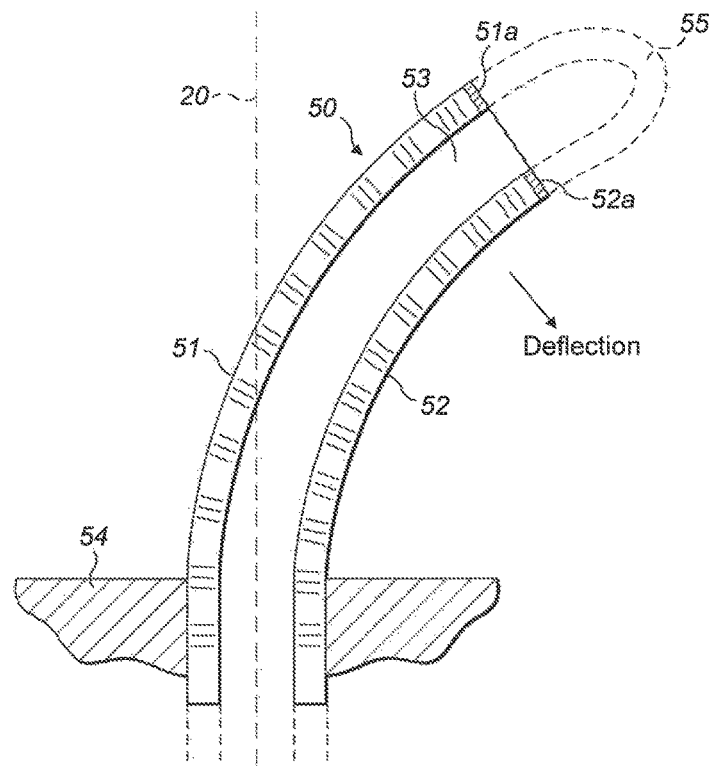
FIG. 5 is a schematic illustration of a second optical fibre sensor arrangement for detecting wind speed.

A further sensor embodiment 50 will now be discussed with reference to FIGS. 5 and 6. FIG. 5 illustrates a version of the sensor of FIGS. 1, 2 and 3 using a plurality of optical fibres containing Fibre Bragg Gratings (FBGs). The sensor of FIG. 5 does not operate by detecting the amount of light lost due to deflection, but instead operates by detecting changes in the frequency or wavelength of the light that is transmitted or reflected by the FBGs in the optical fibre. In this way, a different optical characteristic of the light can be used in the optical fibre sensor, as compared with that of the first embodiment.

Two optical fibres 51 and 52 are mounted on either side of flexible mast 53, extending from the surface 54 of a wind turbine component, such as a wind turbine blade. In one embodiment both optical fibres terminate in mirrors 51a and 52a respectively. A light signal is either input into the base of both optical fibres 51 and 52 and following reflection at respective mirrors 51a and 52a is reflected back to a photo detector or sensing element.

In another embodiment, the optical fibres 51 and 52 are formed by two sections of a single longer fibre which loops back on itself by the terminating loop section 55. In this case, light may be input at both fibres 51 and 52, or simply input into one of the fibres for detection at a photo detector or sensing element connected to the other.

The cores of optical fibres 51 and 52 are provided with gratings such as FBGs or Long Bragg Gratings (LBG) tuned to reflect a particular reference wavelength of light. This wavelength may for example be calibrated or specified for the case when the optical fibres 51 and 52 are parallel to the neutral axis 20. In this neutral position, it is assumed that both optical fibres are also subject to some tension or strain that alters the spacing of the FBGs from its value at rest where the optical fibre is not placed under any strain. The reason for this will be clear from the discussion below. The fibres may be tensioned as well as supported by means of their attachment to the resilient support member 53.

When the optical fibres 51 and 52 are deflected towards the right of the neutral axis by the incident wind (in the trailing edge direction of a wind turbine blade for example), optical fibre 51 extends while optical fibre 52 contracts. The extension or stretching of the 51 results in the spacing of the gratings in optical fibre 51 increasing, while the contraction of optical fibre 52 results in the spacing of the gratings of optical fibre 52 being reduced. As a result, the frequency of light that interacts with the gratings in the respective fibres changes and can be detected by appropriate sensing circuitry. This will be described below.

The two optical fibres are therefore placed under tension so that on contraction of one of the optical fibres 51 or 52, there is leeway in the system for the fibre and for the spacing between the fibres to contract. Preferably optical fibre 51 has a different grating dimension to optical fibre 52. This allows the two optical fibres to be used to detect bending in a particular direction. It will however be appreciated that one or the other of the fibres can be omitted.

Figure 6:
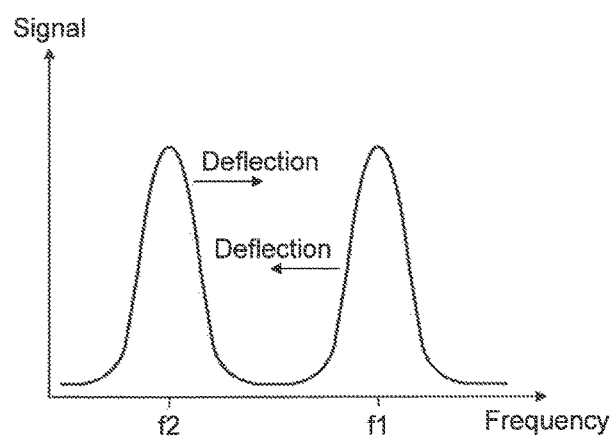
FIG. 6 is a schematic diagram illustrating the relationship between the light signal received from the optical fibre (based on received frequency) and the deflection of the optical fibre.

FIG. 6 shows the spectrum of light signals input into the optical fibres 51 and 52 and reflected by the respective gratings. Frequency f1 indicates the frequency of light that is reflected by the gratings in optical fibre 51, while frequency f2 indicates the frequency of light that is reflected by the gratings in the optical fibre 52. In this diagram, frequency f1 is higher than frequency f2.

Frequencies f1 and f2 are assumed to be the default or calibrated frequencies that interact with the gratings when the optical fibres 51 and 52 are parallel with the neutral axis. As the sensor bends or is deflected to the right of the neutral axis 20, the wavelength of light reflected by the gratings in optical fibre 51 increases and the frequency decreases. Simultaneously, the wavelength of light reflected by the gratings in optical fibre 52 decreases, and the frequency increases. Bending or deflection to the left of the neutral axis can be detected by frequency changes in the opposite direction.

These changes in frequency can be detected and used to determine the amount of deflection, which can in turn be used to give an indication of wind speed.

The frequencies values are shown having different values here to aid understanding. In practice, the frequencies could be the same. The signals from each optical fibre would in that case need to be kept separate from one another so that the optical fibre from which they originate could be properly identified. These is straight forward. The advantage with different frequencies is that a signal optical fibre and sensor arrangement can be used for both optical fibres 51 and 52.

Also, although the frequency signal is shown as a reflected pulse, the sensor could be arranged to detect not reflected light, but transmitted light. In this case, the signals would be valleys in a broader spectrum of transmitted light, corresponding to light frequencies that were essentially blocked by the gratings. In use, control software is needed to control the light signals input into the optical fibres either to pulse signals of varying frequencies and to determine which are reflected back, or sweep continuously through a range of frequencies to determine which are blocked. Such techniques are known to the person skilled in the art, and will not be discussed here.

In order to operate the sensor illustrated in FIG. 5, the sensor suite of FIG. 4 could be used. In that case, the photo detector would need to be able to detect a range of possible frequencies of the resulting light signal. Further, the light source would need to be able to supply a range of frequencies to the optical fibres so that interaction with the gratings can be ensured. Thus, a broad band light source or photo detector may be used.

In addition to optical fibres embodiments involving gratings, it is possible to use interferometer based techniques to measure the amount of deflection of the optical fibres. In order to do this, a second non-sensor or reference optical fibre is necessary. The light signal from light source 42 is then input into both the sensor optical fibre (51 or 52) and the non-sensor or reference optical fibre, and the returned light signals allowed to interfere. As the phase of the light signal received from the sensor optical fibre is dependent on the length of the fibre, which is itself a function of strain or bending, the amount of bending and the associated wind speed can be determined from the interference of the two light signals. Optical fibres that use interferometry techniques are well known and shall not be described further here. For the FBG and the interferometry based sensors, a further reference optical fibre may also be desirable to provide a temperature based reference signal and compensate for thermal expansion of the sensor optical fibres. Such techniques are well known in the art.

In the example above, a technique for measuring wind speed based on the bending of a sensing optical fibre has been discussed. This technique opens up new possibilities for control of the wind turbine. Different control and sensing systems include a Wind Speed Sensors (local and differential), a Fibre Optic Stall Sensor, and Stagnation Point Optical Sensor. In particular, the applicants have found that the wind speed sensor when installed on a wind turbine blade shows a correlation between the localised wind speed, and the optimum angle of attack for the wind turbine in power production.

Figure 7:
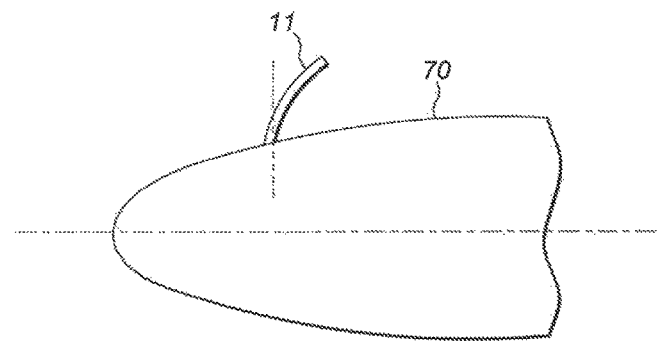
FIG. 7 illustrates use of the sensor embodiments in a local wind speed sensor.

FIG. 7 illustrates the placement of the optical fibre sensor 10, 50 on a wind turbine blade 70 in an arrangement to measure the local wind speed flowing over the wind turbine blade surface. The fibre 11 is placed on the surface at a location corresponding to around 5% to 20% along the chord length measured from the leading edge. Other positions are possible, but this position has been found to give good results.

Only one optical fibre 11 is required for the wind speed sensor, though more can be used if desired and an average figure taken.

Due to the close placement of the optical fibre near the surface of the wind turbine blade it is entirely located within the region of laminar air flow across the blade. As a result the sensor is not affected by the relative motion of the wind turbine rotor as it turns in the air.

In this example, the optical fibre is assumed to extend into the air flow by between 10 mm and 50 mm, and have a thickness of 1 mm. The optical fibre itself can be a standard plastic optical fibre having an inner core of PMMA (Polymethyl methacrylate) and a cladding of epoxy.

Figure 8:
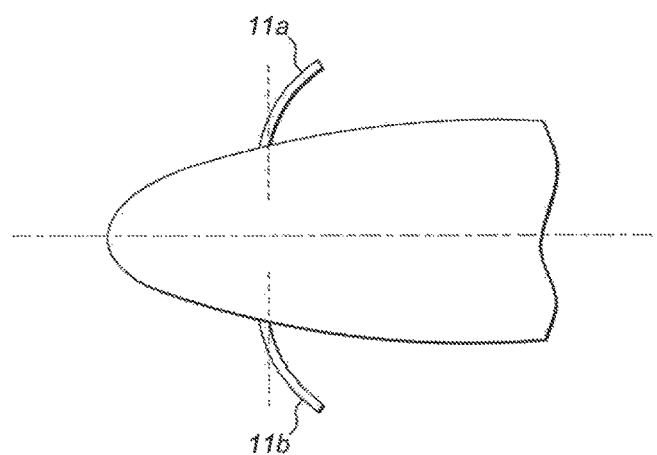
FIG. 8 illustrates use of the sensor embodiments in a differential wind speed sensor.

FIG. 8 shows a similar arrangement in which a second optical fibre 11b is located under the wind turbine blade. This gives a local wind speed measurement of the wind speed on the pressure side of the blade, rather than the suction side as illustrated in FIG. 7. The sensors can also be used in conjunction with optical fibre pressure sensors such as those described in the applicant's International application WO2011/015383. Using the data from the sensors illustrated in FIGS. 7 and 8, it is possible to determine the optimal angle of attack for the wind turbine blade given the current power production settings. This type of sensor may therefore advantageously be used to feed a signal to the blade pitch controller.

Figure 9:
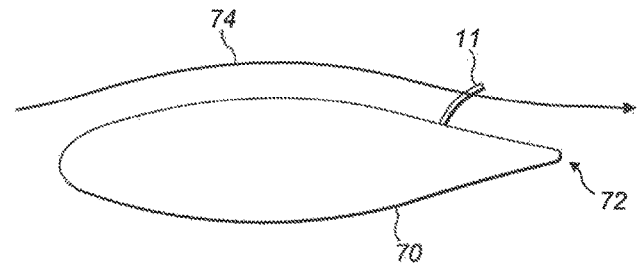
FIGS. 9 and 10 illustrate use of the sensor embodiments in a stall sensor.
Figure 10:
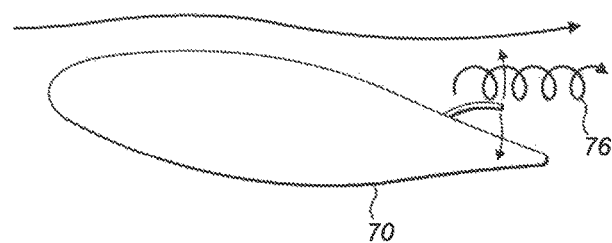

FIGS. 9 and 10 illustrates the use of the optical fibre sensor described above in a stall sensor for a wind turbine blade. As shown in FIG. 9, the optical fibre is located towards the rear of the wind turbine blade 70 near the trailing edge 72. As will be discussed below, it has also been found advantageous to angle the optical fibre towards the trailing edge in order to establish its neutral axis.

FIG. 9, shows the situation for normal non-stall operating conditions. In this case, the air flow 74 over the blade will be laminar and the light signal output from the sensor will fluctuate solely due to changes in local wind speed. These fluctuations may be made small by angling the optical fibre towards the rear of the blade.

However, as the angle of attack of the blade increases to the situation shown in FIG. 10, the air flow over the top surface of the blade ceases to be laminar and becomes turbulent 76. Eddies or vortices appearing in the flow on the surface of the wind turbine blade towards the trailing edge will then buffet the optical fibre and cause it to oscillate in the turbulent air flow. The signal from the optical fibre will therefore be more chaotic and rapidly changing than for the laminar flow situation. The transition between the laminar and turbulent flow situations can therefore be easily detected and used to indicate that the blade has entered a stall.

Figure 11:
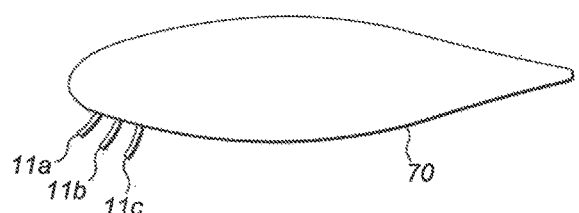
FIG. 11 illustrates the use of sensor embodiments in a stagnation point sensor.

FIG. 11 illustrates a similar arrangement in which a plurality of optical fibres (11a, 11b, 11c) are located on the pressure side of the blade towards the leading edge. The light signal from the plurality of optical fibres can be used to determine the stagnation point for the wind turbine blade, that is the location at which the local wind speed is zero. Although three optical fibres are shown here, any number may be used based on the principle that it is necessary to cover that part of the surface of the blade with fibres where the stagnation point is expected to fall. Those optical fibres not in the stagnation point will show a non-zero value for the local wind speed, while those optical fibres located at the stagnation point will show a zero value for local wind speed or minimum value.

In alternative embodiments, the wind turbine can be provided with a plurality of sensors in different locations and orientations. This can be used to build up a map of wind velocities across the surface of the blade. In the above examples, the wind turbine components described are wind turbine blades. In other embodiments, the components might be the rotor, the rotor hub, the tower, or the nacelle of the wind turbine plant. The sensor suite of FIG. 4 may for example be advantageously located in the rotor hub and provide light signals and detection for optical fibre sensors located in respective wind turbine blades. The wind turbine component can also comprise an element of the surface of any of the other components mentioned above.

The electrical or electronic components used in the sensor described above are relatively inexpensive, comprising in the simplest implementation a Light Emitting Diode and a Photodiode system coupled to the optical fibre and the processing system. Other embodiments may comprise more complex components. These will still however be considerably less expensive and easier to maintain than the LIDAR systems mentioned in the introduction.

In the embodiments described above a first end of the sensing portion of the optical fibre is fixed at the surface of the wind turbine component surface, and a second end of the sensing portion is free to move in the air flow. In this case, the second end may be the looped over region of a single optical fibre. In alternative embodiments, the optical fibre may be suspended between two components, such as the roof of the nacelle and a mounting fin such that that the amount of bending experienced by the optical fibre between the two components is used to indicate the local wind speed. This may be used in a simple anemometer device.

Although a number of different embodiments have been described, these are not intended to be limiting, and are instead merely intended to be illustrative of the invention as defined by the following claims. In particular, it is possible to use features of the respective different embodiments in combination with each other. The resilient member 52 of the second embodiment may for example be used in the first embodiment also, if more support for the optical fibre is desired.

What is claimed is:

1. A wind turbine component comprising:
    an optical fibre extending from the wind turbine component surface into an air flow region adjacent the wind turbine component surface, that includes a first sensing portion extending from the surface of the wind turbine component, a terminating loop section connected to the first sensing portion, and a second portion connected to the terminating loop section and returning to the surface of the wind turbine component, wherein the optical fibre doubles back on itself via the terminating loop section, such that the optical fibre first and second sensing portions bend as a result of a force exerted by the air flow;
    a light source for inputting a light signal into at least one end of the optical fibre, the light signal having an optical characteristic that is changed by its transmission through the optical fibre and by the amount the optical fibre is bending;
    a photo detector for receiving a light signal from the sensing portion of the optical fibre; and
    a controller coupled to the photo detector to determine the wind speed from the optical characteristic of the received light signal.

2. The wind turbine component of claim 1, wherein the bending of the optical fibre sensing portion is constrained to a first axial direction.

3. The wind turbine component of claim 1, wherein the bending of the optical fibre sensing portion has a range defined by a maximum and a minimum value, and wherein a no wind situation corresponds to one of the minimum value and a middle value.

4. The wind turbine component of claim 1, wherein first ends of the first and second sensing portions are fixed at the surface of the wind turbine component surface, and second ends of the first and second sensing portions are free to move in the air flow.

5. The wind turbine component of claim 1, wherein the optical characteristic is the intensity of the received light, and wherein the surface of the optical fibre first sensing portion and second sending portion each has one or more light loss portions arranged to allow light to escape from the fibre, the amount of light escaping from the fibre depending on the amount of bending of the light loss portion.

6. The wind turbine component of claim 5, wherein the light loss portions comprise cut-outs in the coating of the optical fibre.

7. The wind turbine component of the claim 6, wherein the cut outs are serrations.

8. The wind turbine component of claim 1, wherein the first sensing portion and the second sending portion are attached to a resilient support member also extending into the air flow.

9. The wind turbine component of claim 8, wherein the optical fibre first sensing portion and second sensing portion each has one or more gratings, the spacing of the gratings changing due to bending of the sensing portion.

10. A stall sensor for a wind turbine blade comprising the wind turbine component of claim 1.

11. A stagnation point sensor for a wind turbine blade comprising the wind turbine component of claim 1.

12. A method of detecting the speed of the air flow across a wind turbine component, the method comprising:
    inputting a light signal into a first sensing portion of an optical fibre extending from the wind turbine component surface into an air flow region adjacent the wind turbine component surface, that includes the first sensing portion extending from the surface of the wind turbine component, a terminating loop section connected to the first sensing portion, and a second portion connected to the terminating loop section and returning to the surface of the wind turbine component, wherein the optical fibre doubles back on itself via the terminating loop section, such that the optical fibre first and second sensing portions bend as a result of a force exerted by the air flow, and the light signal having an optical characteristic that is changed by its transmission through the optical fibre and by the amount the optical fibre is bending;
    receiving a light signal from the second sensing portion of the optical fibre; and
    determining the speed of the air flow from the optical characteristic of the received light signal.

13. The method of claim 12, wherein the optical characteristic is one of the intensity of the light and the frequency of the light received from the optical fibre.

14. The wind turbine component of claim 1, wherein the first sensing portion of the optical fibre is disposed on a first side of a resilient support member and wherein the second sensing portion is disposed on an opposing second side of the resilient support member, wherein the first sensing portion and the second sensing portion are maintained under tension when in a neutral position, and wherein the first and second sensing portions experience different amounts of tension when the first and second sensing portions bend.

* * * * *